(12) United States Patent
Spierling

(10) Patent No.: US 11,312,222 B2
(45) Date of Patent: Apr. 26, 2022

(54) SERIES HYBRID ARCHITECTURES USING COMPOUNDED DOUBLY FED MACHINES

(71) Applicant: Hamilton Sundstrand Corporation, Charlotte, NC (US)

(72) Inventor: Todd A. Spierling, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 167 days.

(21) Appl. No.: 16/293,822

(22) Filed: Mar. 6, 2019

(65) Prior Publication Data

US 2020/0282819 A1    Sep. 10, 2020

(51) Int. Cl.
| | |
|---|---|
| *B60K 6/26* | (2007.10) |
| *B60K 1/02* | (2006.01) |
| *B60K 6/46* | (2007.10) |
| *H02P 9/00* | (2006.01) |
| *H02P 5/68* | (2006.01) |
| *B60W 10/06* | (2006.01) |
| *B60W 10/08* | (2006.01) |

(52) U.S. Cl.
CPC .............. *B60K 6/26* (2013.01); *B60K 1/02* (2013.01); *B60K 6/46* (2013.01); *H02P 5/68* (2013.01); *H02P 9/007* (2013.01); *B60W 10/06* (2013.01); *B60W 10/08* (2013.01)

(58) Field of Classification Search
CPC .. B60K 6/26; B60K 6/46; B60K 1/02; B60W 10/06; B60W 10/08; H02P 5/68; H02P 9/007
See application file for complete search history.

(56) References Cited

U.S. PATENT DOCUMENTS

| | | | |
|---|---|---|---|
| 4,982,147 A | 1/1991 | Lauw | |
| 8,093,739 B2 | 1/2012 | Gilchrist, III et al. | |
| 9,776,583 B2 | 10/2017 | Edwards | |
| 2010/0176606 A1* | 7/2010 | Gilchrist, III | H02J 3/08 290/40 C |
| 2012/0187758 A1* | 7/2012 | Boskovitch | B60L 15/007 307/10.1 |
| 2016/0365810 A1* | 12/2016 | Armstrong | B64D 27/24 |

(Continued)

OTHER PUBLICATIONS

Birudula et al., "Optimization With Load Prediction in Asynchronous Generator Driven Tugboat Propulsion System," 2017 IEEE Transportation ELectrification Conference (ITEC-India), Dec. 13, 2017, 6 pages.

(Continued)

*Primary Examiner* — Sean Gugger
(74) *Attorney, Agent, or Firm* — Cantor Colburn LLP

(57) ABSTRACT

Provided are embodiments of a system including a series hybrid architecture using compounded doubly fed induction machines. Embodiments include a controller configured to control the operation of the system, and a power source configured to convert a first form of energy to a second form of energy. Embodiments also include a first machine configured to generate power, wherein the first machine is mechanically coupled to the power source, and a second machine configured to control equipment, wherein the first machine is electrically coupled to the second machine. Embodiments further include methods for operating the series hybrid architecture using the compounding doubly fed induction machines.

9 Claims, 4 Drawing Sheets

(56) References Cited

U.S. PATENT DOCUMENTS

2018/0372465 A1* 12/2018 Himmelmann ......... F42B 19/24
2019/0058426 A1 2/2019 Rothenhagen et al.

OTHER PUBLICATIONS

European Search Report; European Application No. 19212246.3; Application Filed: Nov. 28, 2019; Search Report dated Jul. 1, 2020; 9 pages.

* cited by examiner

SERIES HYBRID ARCHITECTURES USING COMPOUNDED DOUBLY FED MACHINES

BACKGROUND

The present disclosure relates to power generation systems and more particularly to series hybrid architectures using compounded doubly fed induction machines.

Power generation systems can be based on various sources including the combustion of fuels including oil, coal, and gas. The power generation systems can include engines used to produce a force to rotate turbines that can be coupled to generators to produce electrical power. The electrical power can then be used to power other systems and subsystems. Because the generators are coupled to the engines their electrical power and frequency is proportional to the rotational speed of the turbine. Techniques for improving the operation of the efficiency of power generation are described herein.

BRIEF DESCRIPTION

According to an embodiment, a system including a series hybrid architecture using compounded doubly fed induction machines is provided. The system includes a controller configured to control the operation of the system, and a power source configured to convert a first form of energy to a second form of energy. The system also includes a first machine configured to generate power, wherein the first machine is mechanically coupled to the power source, and a second machine configured to control equipment, wherein the first machine is electrically coupled to the second machine.

In addition to one or more of the features described herein, or as an alternative, further embodiments include a first machine that is a doubly fed induction generator.

In addition to one or more of the features described herein, or as an alternative, further embodiments include a second machine that is a doubly fed induction motor.

In addition to one or more of the features described herein, or as an alternative, further embodiments include independently operating the first machine and the second machine.

In addition to one or more of the features described herein, or as an alternative, further embodiments include a first power electronics circuit that is configured to detect an output of the first machine and provide a first signal to the first machine to change the output of the first machine.

In addition to one or more of the features described herein, or as an alternative, further embodiments include a first machine that includes a rotor and a stator, where a first signal is provided to the stator of the first machine.

In addition to one or more of the features described herein, or as an alternative, further embodiments include a second power electronics circuit that is configured to detect an input to the second machine, and providing a second signal to control an output of the second machine.

In addition to one or more of the features described herein, or as an alternative, further embodiments include a rotor and a stator of a second machine, where a second signal is provided to the rotor of the second machine.

In addition to one or more of the features described herein, or as an alternative, further embodiments include a power source that is an engine.

According to another embodiment, a method for operating a series hybrid architecture using compounded doubly fed induction machines is provided. The method includes generating electrical power at a first machine, transmitting the electrical power to a second machine to operate the second machine, and selecting a speed of operation for the second machine by controlling the operation of the second machine. The method also includes comparing a current speed of operation of the second machine to the selected speed of operation, and providing an excitation signal to the second machine based at least in part on the comparison.

In addition to one or more of the features described herein, or as an alternative, further embodiments include modifying the electrical output of the first machine, wherein modifying the electrical power of the first machine includes detecting the electrical power at a first power electronics circuit, comparing the electrical power to a value for an electrical output level, providing an excitation signal to the first machine based on the comparison, modifying the electrical power based on the excitation signal, and providing the modified electrical power to the second machine.

In addition to one or more of the features described herein, or as an alternative, further embodiments include receiving the electrical power at a second power electronics circuit, comparing the received electrical power to a value for a threshold level, and providing the excitation signal to the second machine to control the speed of operation of the second machine.

In addition to one or more of the features described herein, or as an alternative, further embodiments include a first machine that is a doubly fed induction generator.

In addition to one or more of the features described herein, or as an alternative, further embodiments include a second machine that is a doubly fed induction motor.

In addition to one or more of the features described herein, or as an alternative, further embodiments include providing the excitation signal to the first machine is provided to rotor windings of the first machine.

In addition to one or more of the features described herein, or as an alternative, further embodiments include providing the excitation signal to the second machine is provided to the rotor windings of the second machine.

In addition to one or more of the features described herein, or as an alternative, further embodiments include a first machine that receives power to rotate the rotor of the first machine.

In addition to one or more of the features described herein, or as an alternative, further embodiments include electrical power that is received at a stator of the second machine.

In addition to one or more of the features described herein, or as an alternative, further embodiments include receiving energy at the first machine from an engine.

In addition to one or more of the features described herein, or as an alternative, further embodiments include independently operating the first machine and the second machine.

Technical effects of embodiments of the present disclosure include operating the gas turbine of the power generation unit at an optimal speed while independently operating a fan of a vehicle at various speeds. In addition, the technical effects also allow for minimizing the required power electronics used in the system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
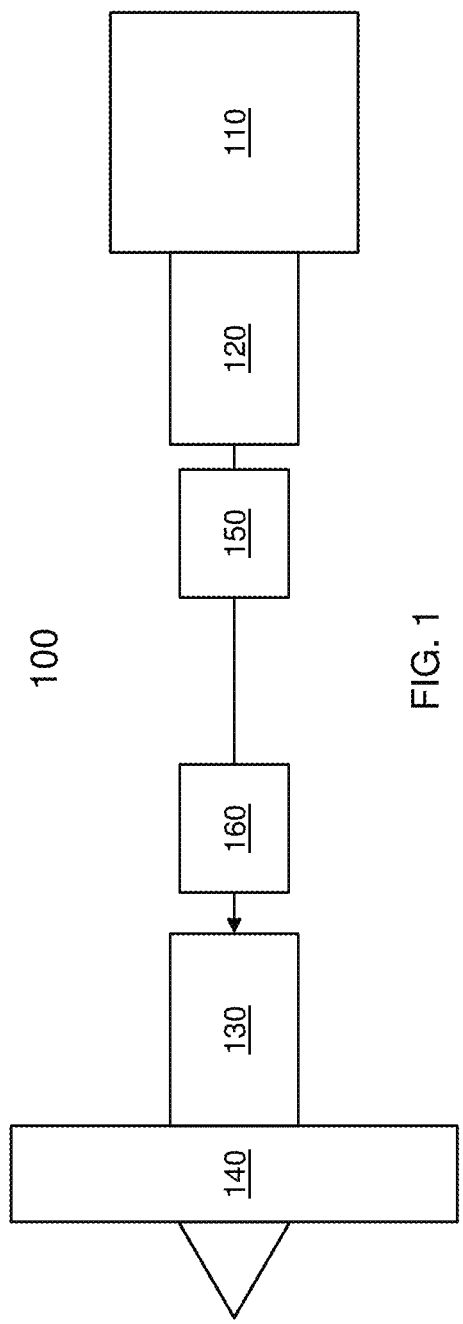
FIG. 1 depicts a system for controlling a fan.

Induction machines include a stator and rotor which operated to generate a magnetic field to generate an output current. The induction machines can include generator-type and motor-type machines. The rotor of the generator is coupled to a power source that causes the rotor to rotate within the magnetic field of the stator to produce an output. A motor is configured to receive an electrical input to cause the rotor of the motor to rotate to drive an output such as a fan, pump, or other equipment.

Doubly fed induction machines can be operated to receive an excitation input to the stator and rotor to control the output. For example, a doubly fed induction generator can receive an excitation current in the rotor windings to change the magnetic field to control the output of the generator. Because the output voltage and current are proportional to the frequency of the rotational speed of the rotor, additional control can be achieved by feeding the rotor windings with an excitation current.

A motor, for example, can receive a three-phase electrical input to cause a rotating magnetic field. The excitation current provided to the rotor windings can be controlled to modify the rotational speed output of the motor. In a doubly fed induction motor, the stator and the rotor are used to set the output of the motor. That is, two rotating magnetic fields are created and the output is a function of both magnetic fields. The rotational speed of the rotor is now dependent on the speed and direction of the input to each of the rotating magnetic fields. By varying the frequency of the rotor inputs, the speed of the motor can be controlled.

In existing series hybrid architectures, full rating power electronics are used to convert power output from the generator. Additional power electronics are used to convert the received power to a form that is usable to drive other machines and equipment at a desired operating speed. However, the power electronics add significant weight/volume/size to the limited area. Power electronics can include large components such as the capacitors and inductors that can be used in rectifiers, filters, and inverters.

Other existing series hybrid architectures directly link the AC power from the generator to the motor. However, provided in this architecture the speed of the motor is directly dependent on the speed of the generator and the relative generator/motor pole counts. Although this architecture makes use of minimum power electronics, the gas turbine must be able to run at varying speeds for fan speed control where independent fan operation is no longer possible.

The techniques described herein provide for implementing an AC series hybrid architecture with compounded doubly fed induction machines. By using the doubly fed induction machines for the motor and generator portions of the series hybrid architecture, the motor and generator speeds can be decoupled, and the power electronics can be sized to only process a fraction of the total power thereby minimizing the size of the power electronics.

Referring to FIG. 1, a system 100 is shown. The system 100 includes an engine 110, which can be coupled to a generator 120. A shaft that is coupled to a turbine can cause the rotor of the generator 120 to rotate in the magnetic field of the generator 120 to produce electric power. The power from the generator 120 is used to provide power to a motor 130 to drive a fan 140. The power from the generator 120 is provided to a power electronics circuit 150 which can convert the AC output of the generator to DC. The output of the power electronics circuit 150 can be provided to a power electronics circuit 160 which produces a controlled AC signal to provide to the motor 130.

However, this particular series configuration requires the full rated power electronics circuits 150, 160 which can be very heavy and large. Such elements must be considered when used on vehicles having limited space or vehicles used for flight.

Figure 2:
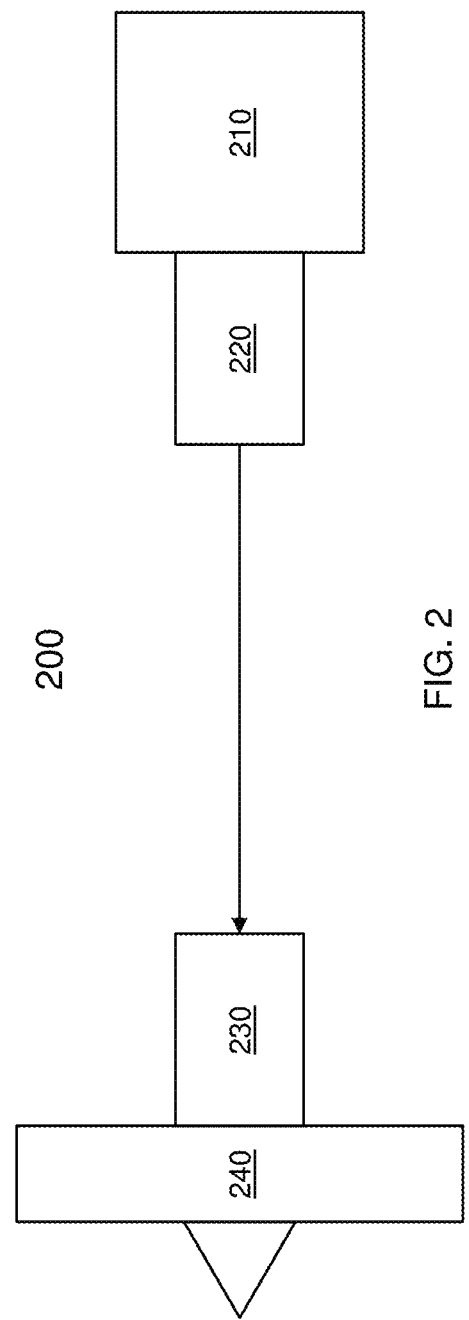
FIG. 2 depicts another system for controlling a fan.

Referring now to FIG. 2, another system 200 is shown. The output of the generator 220 is directly coupled to the input of a motor 230 that is used to drive the fan 240. The generator 220 outputs an AC signal that is directly proportional to the operation of the engine 210. Using this architecture, the motor 230 that is used to drive the fan 240 will experience the variation in the operation of the engine 210 which can lead to inefficient operation.

Figure 3:
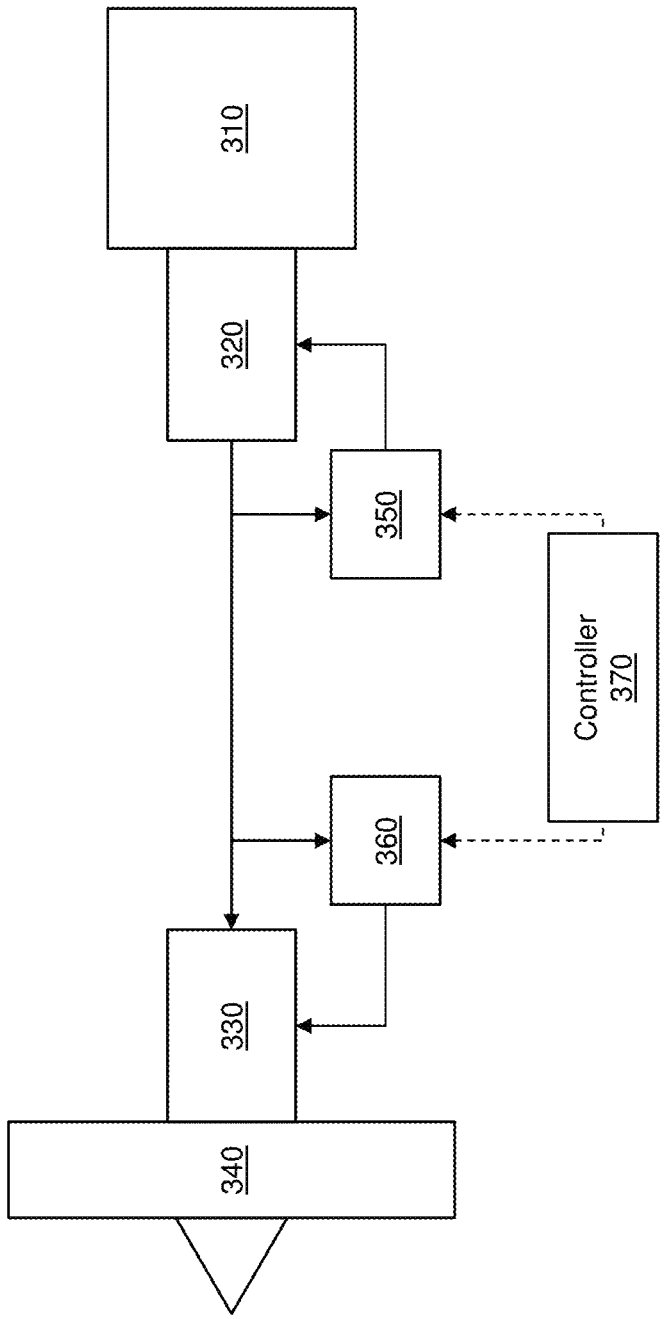
FIG. 3 depicts a series hybrid architecture using compounded doubly fed induction machine in accordance with one or more embodiments.

Now referring to FIG. 3, a system 300 of a series hybrid architecture using compounded doubly fed induction machines is shown. The engine 310 of FIG. 3 can include several components to convert fuel energy to mechanical energy. For example, the engine 310 can be a rotating engine that receives fuel to produce power to rotate a shaft coupled to the generator 320. The engine 310 can include a core, a low/high-pressure compressor, and a low/high-pressure turbine (not shown) to convert the fuel energy to rotational energy for the generator 320.

In one embodiment, the first machine 320 is a doubly fed induction generator. The rotor of the doubly fed induction generator is controlled by the rotation of the turbine of the engine which causes the rotor to rotate in the magnetic field producing current. The doubly fed induction generator can receive an excitation current to rotor windings (not shown) which can modify the electrical power output of the generator. The doubly fed induction generator can also receive an excitation current at the stator where the electrical output of the generator is a function of both the magnetic field of the stator and rotor.

In some embodiment, the second machine 330 is a doubly fed induction motor. The doubly fed induction motor is configured to receive a first input such as the electrical output from the generator. The received input can be a 3-phase AC input and can be provided to the stator to generate a magnetic field in the motor. The input is provided to the stator which in turns drives the rotor. The doubly fed induction motor can also receive an excitation signal to the rotor to modify the rotational output of the motor. That is, the rotational speed of the shaft of the motor which can be used to drive the fan can be changed and controlled at a desired operational speed using the excitation signal.

A first power/frequency converter 350 can monitor the output of the generator 320. The output of the power/frequency converter 350 can be adjusted to control the output electrical power of the generator 320 as desired. That is, the output of the stator can be modified by the signal from the power/frequency converter 350 provided to the rotor windings to effect the electrical power output the generator 320. For example, the converter 350 can detect the AC power and compare it to a threshold level. Based on the comparison the excitation signal can be provided to the rotor of the generator 320 to change the magnetic field which affects the electrical output of the generator 320.

A second power/frequency converter 360 can monitor an electrical input to the motor 330. The converter 360 can compare the input to a threshold level. Based on the comparison the excitation signal can be provided to the rotor of the motor 330 to change the magnetic field which affects the rotational speed of the motor 330.

A controller 370 can be used to control the operation of the first and second power/frequency converter. By implementing a doubly fed induction generator and doubly fed induction motor in a series hybrid architecture, the power electronics can be sized and reduced. In addition, the engine 310 can be operated at a reduced optimal speed while providing flexible control an electric motor coupled to a generator. By using the doubly fed induction machines the engine can be operated at a reduced rate or an optimal rate and the fan speed can now be independently controlled.

Figure 4:
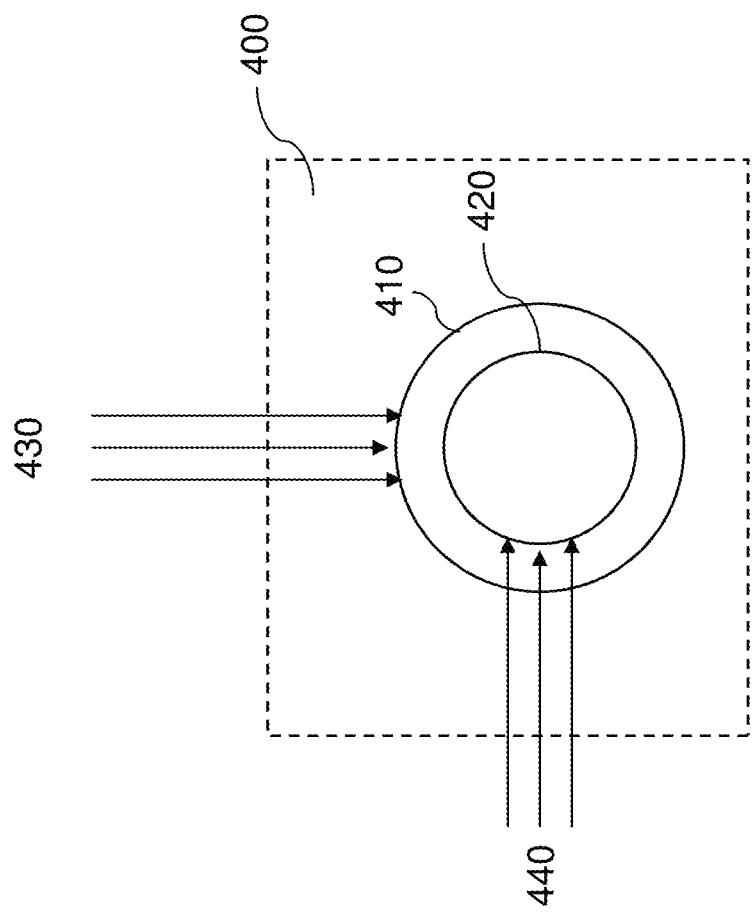
FIG. 4 depicts a rotor and stator used in a doubly fed induction machine in accordance with one or more embodiments.

Referring now to FIG. 4, a doubly fed induction machine 400 (hereinafter referred to as "machine 400") in accordance with one or more embodiments is shown. The machine 400 includes a stator 410 and a rotor 420 to produce mechanical force when operating as a motor and produce electrical power when operating as a generator. In one or more embodiments the stator 410 is configured to receive excitation signal 430 to energize the stator 410. The excitation signal 430 can include an AC or DC signal. The rotor 420 can receive an excitation signal 440 to modify the output of the machine 400. When operating as a generator, the electrical output of the machine can be a function of both excitation signals 430, 440. When operating as a motor, the rotational speed of the rotor 440 of the machine 400 can be a function of both excitation signals 430, 440. The excitation signals 430, 440 can be provided to windings that are in the rotor 420 or coils in the stator 410. In some embodiments, the excitation signals 430, 440 can be controlled by system controllers and power/frequency converters such as that shown in FIG. 3.

Figure 5:
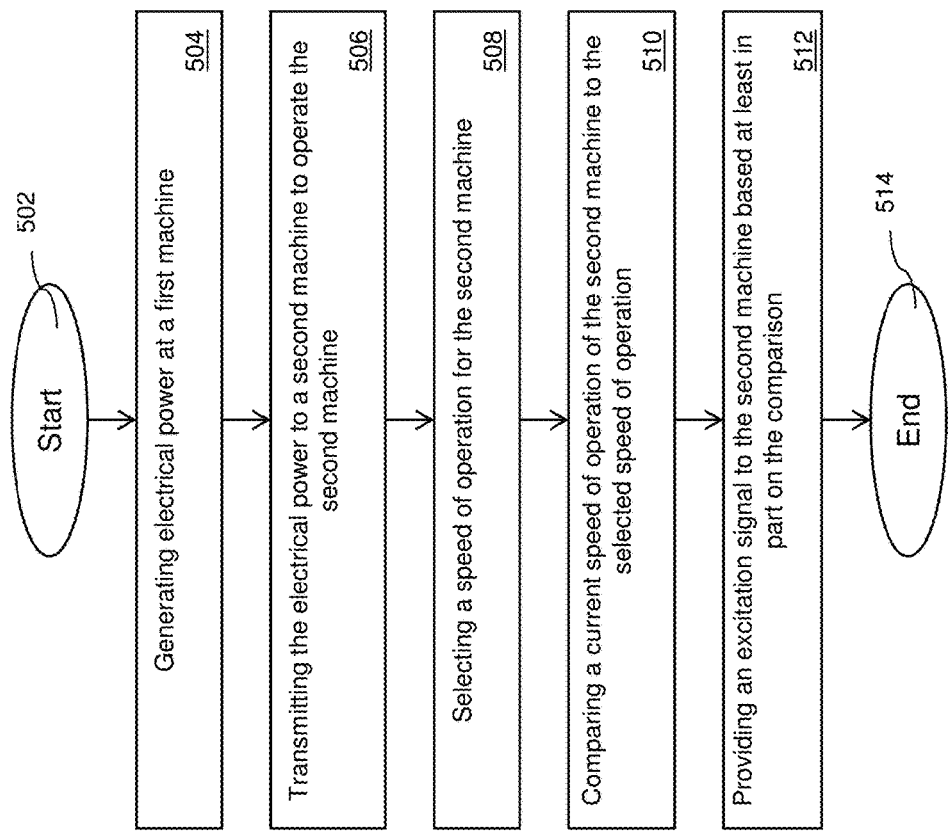
FIG. 5 depicts a flowchart of a method for operating the series hybrid architecture using compounded doubly fed induction machine in accordance with one or more embodiments.

Now referring to FIG. 5, a method 500 for controlling a series hybrid architecture using compounded doubly fed induction machines is shown. The method 500 can be implemented in the series hybrid architecture such as that shown in FIG. 3. It should be understood the method 500 can also be implemented in architectures having a different configuration and is not limited to that shown in FIG. 3. The method 500 begins at block 502 and proceeds to block 504 which provides for generating electrical power at a first machine. The electrical power can be generated by a generator such as a doubly fed induction generator.

The method 500 at block 506 provides for transmitting the electrical power to a second machine to operate the second machine. In one or more embodiments, the second machine is a doubly fed induction motor. The motor can receive the electrical power at a stator of the motor which causes the rotor to rotate at a speed which can be used to drive equipment such as a fan.

Block 508 provides for selecting a speed of operation for the second machine. The speed can be selected to operate a fan at a desired speed. The motor speed is not completely dependent on the electrical power from the generator.

At block 510, the method 500 provides for comparing a current speed of operation of the second machine to the selected speed of operation. Continuing to block 512 the method 500 includes providing an excitation signal to the second machine based at least in part on the comparison. The excitation signal can be an AC excitation signal that is provided to the rotor where the speed of the rotor will be a function of the received AC power from the generator and the received AC excitation signal received at the rotor of the motor. The method 500 ends at block 514. It is to be understood that one or more steps can be continuously repeated. In addition, other steps and or a different combination of steps can be used.

The technical effects and benefits provide an architecture that will use a fraction of the power electronics for minimum weight, volume, and losses while maintaining maximum fan speed control. This architecture allows for innovative vehicle architectures and failure mode operation. The technical effects and benefits include a reduction in the size of the power electronics. Since the power electronics are now only required to process a fraction of the total power, they can be sized accordingly to reduce its weight, volume, and size.

The technical effects and benefits allow for the operation of the engine at a reduced speed while maintaining the desired performance at a coupled device such as a motor driving a fan or pump.

A detailed description of one or more embodiments of the disclosed apparatus and method are presented herein by way of exemplification and not limitation with reference to the Figures.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for operating a series hybrid architecture using compounded doubly fed induction machines, the method comprising:
    generating electrical power at a first machine;
    transmitting the electrical power to a second machine to operate the second machine;
    selecting a speed of operation for the second machine by controlling the operation of the second machine;
    comparing a current speed of operation of the second machine to the selected speed of operation; and
    providing an excitation signal to the second machine based at least in part on the comparison,
    wherein the first machine and the second machine are independently operated;
    further comprising modifying the electrical output of the first machine, wherein modifying the electrical power of the first machine comprises:
        detecting the electrical power at a first power electronics circuit;
        comparing the electrical power to a value for an electrical output level;
        providing an excitation signal to the first machine based on the comparison;
    further comprising receiving the electrical power at a second power electronics circuit;
        comparing the received electrical power to a value for a threshold level; and
        providing the excitation signal to the second machine to control the speed of operation of the second machine, wherein the first power electronics circuit is not connected to the second power electronics circuit over a direct current (DC) link.

2. The method of claim 1, further comprising modifying the electrical output of the first machine, wherein modifying the electrical power of the first machine comprises:
    modifying the electrical power based on the excitation signal; and
    providing the modified electrical power to the second machine.

3. The method of claim 1, wherein the first machine is a doubly fed induction generator.

4. The method of claim 3, wherein the second machine is a doubly fed induction motor.

5. The method of claim 1, wherein providing the excitation signal to the first machine is provided to rotor windings of the first machine.

6. The method of claim 1, wherein providing the excitation signal to the second machine is provided to the rotor windings of the second machine.

7. The method of claim 1, further comprising receiving power at the rotor of the first machine.

8. The method of claim 1, further comprising receiving the electrical power at a stator of the second machine.

9. The method of claim 1, further comprising receiving energy at the first machine from an engine.

* * * * *